United States Patent [19]

Sibley et al.

[11] 4,114,839

[45] Sep. 19, 1978

[54] AERIAL PHOTOGRAPHY CAMERA MOUNT ASSEMBLY

[76] Inventors: Clarence E. Sibley, HQ 26 TRW, Box 1331, APO New York, N.Y. 09860; Francisco C. Sablan, 13 Woodland Dr., Mary Esther, Fla. 32569

[21] Appl. No.: 826,085

[22] Filed: Aug. 19, 1977

[51] Int. Cl.[2] ............................................. B64D 47/08
[52] U.S. Cl. ............................. 244/118 R; 248/178; 354/74
[58] Field of Search ............ 244/129.1, 129.5, 118 R, 244/137 R, 1 R; 354/65, 74, 81, 113, 293, 294, 70; 89/37.5 R, 37.5 A, 37.5 D, 37.5 E; 33/1 A; 248/178, 187, 23, 346

[56] References Cited

U.S. PATENT DOCUMENTS

| | | | |
|---|---|---|---|
| 2,242,201 | 5/1941 | Woods | 244/129.5 |
| 2,842,026 | 7/1958 | Reese et al. | 354/293 |
| 3,421,721 | 1/1969 | Miller | 354/74 |
| 3,598,355 | 8/1971 | English | 248/178 |
| 3,731,607 | 5/1973 | Mandler | 354/294 |
| 3,788,585 | 1/1974 | Masseron | 354/293 |
| 3,801,051 | 4/1974 | Hosterman et al. | 244/137 R |
| 3,805,977 | 4/1974 | Fritzsche et al. | 244/137 R |
| 4,044,364 | 8/1977 | Prinzo | 354/74 |

FOREIGN PATENT DOCUMENTS 637,225  4/1933  Fed. Rep. of Germany ....... 89/37.5 R Primary Examiner—Galen L. Barefoot
Attorney, Agent, or Firm—Joseph E. Rusz; Arsen Tashjian

[57] ABSTRACT

An assembly for mounting, supporting and releasably holding a vertically positioned aerial photography camera, and an angularly adjustable obliquely positioned aerial photography camera, in an aircraft having a downwardly and outwardly opening ramp to which the assembly is removably attached, and also having an upwardly and inwardly opening tail door, where the ramp and the door are openable and closeable during flight of the aircraft. The assembly includes: a lower member subassembly in the form of a rectangular frame; and, two upper member subassemblies, each of which carries one of the cameras. These upper subassemblies are rectangular-like in form and are detachably connected to, and slidably movable horizontally above, the lower subassembly. In flight, with the ramp and the door open, the upper assemblies are separately extendable beyond the ramp, and aerial photographs may be taken.

10 Claims, 12 Drawing Figures

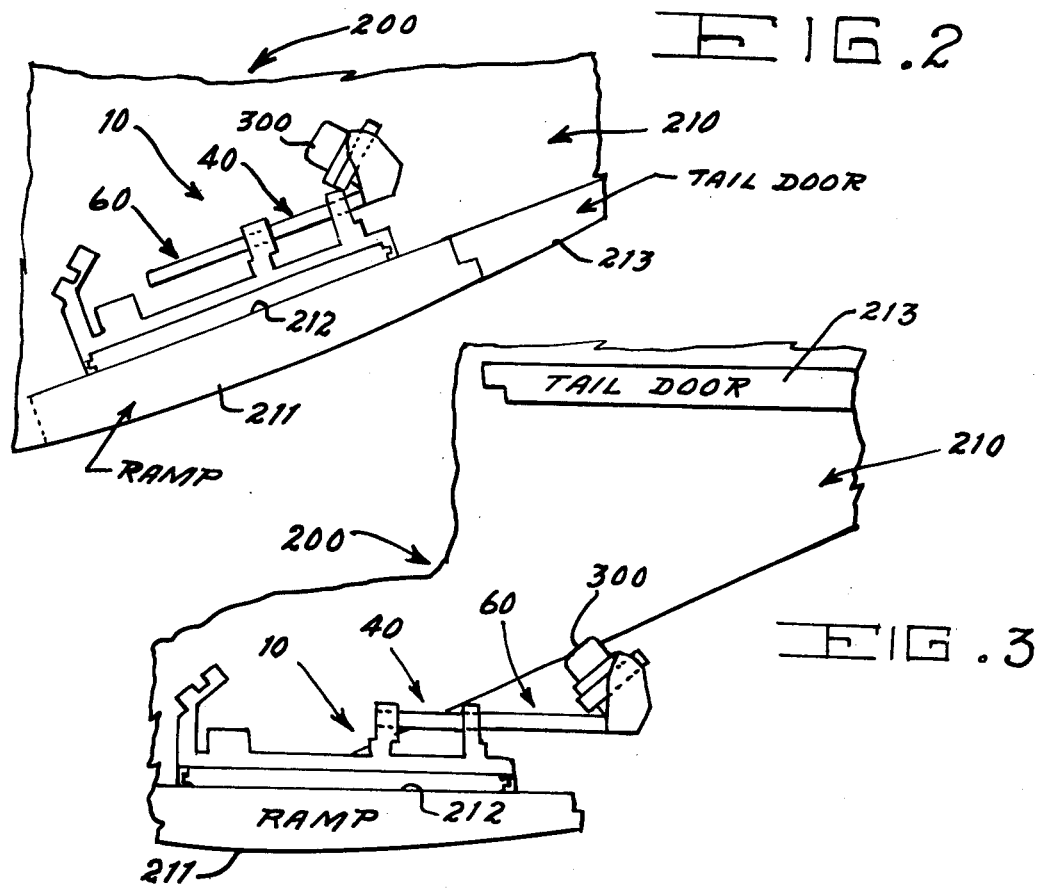
FIG. 2
FIG. 3
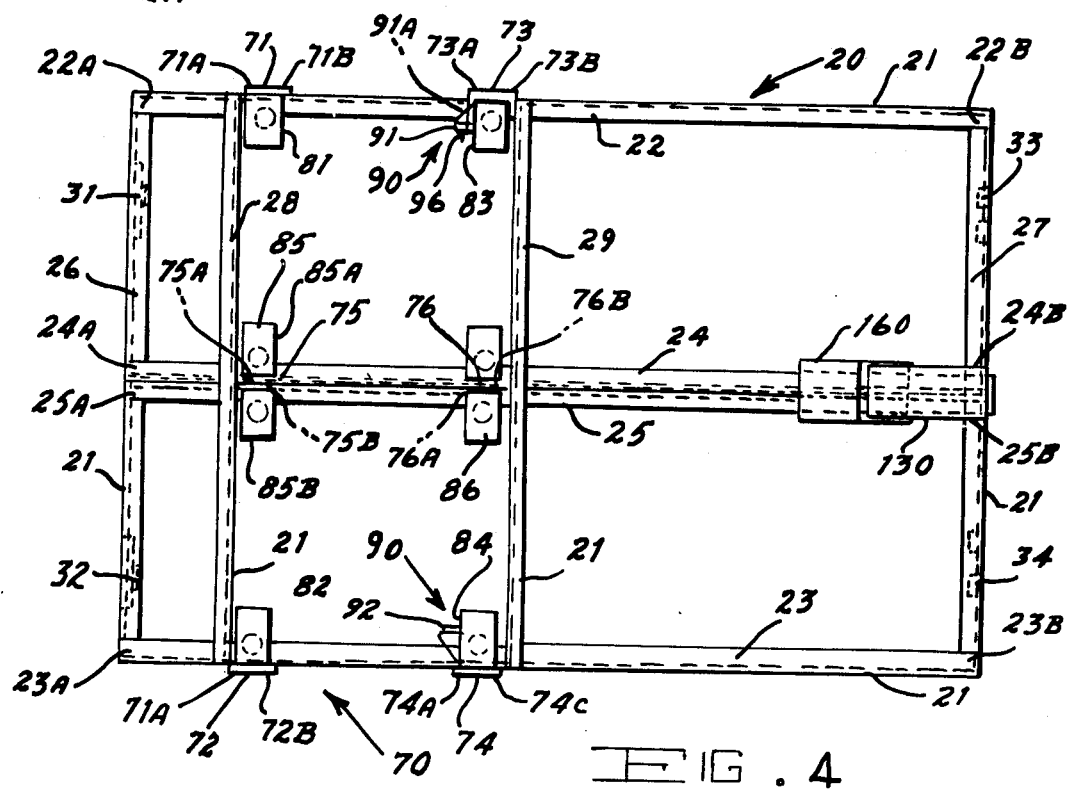
FIG. 4

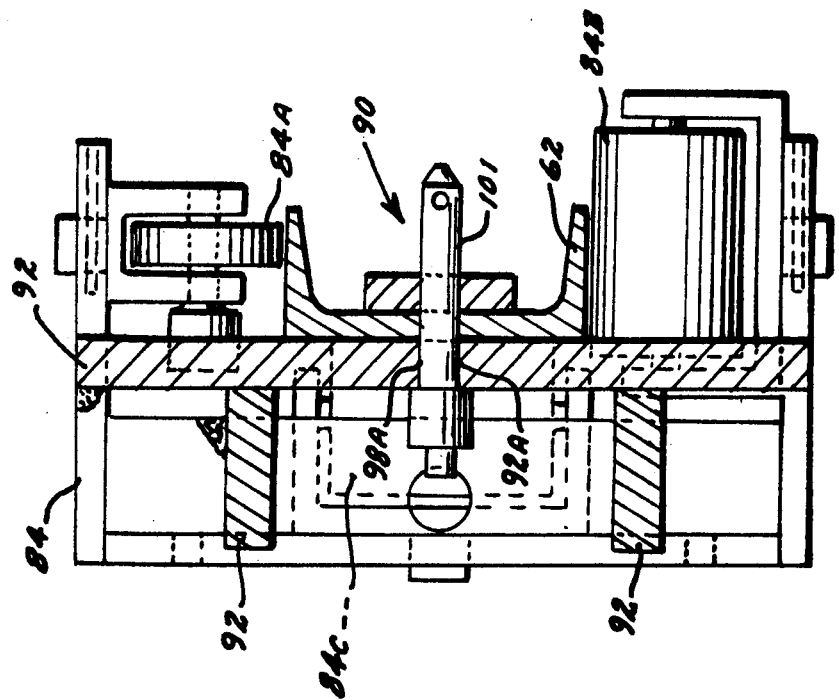
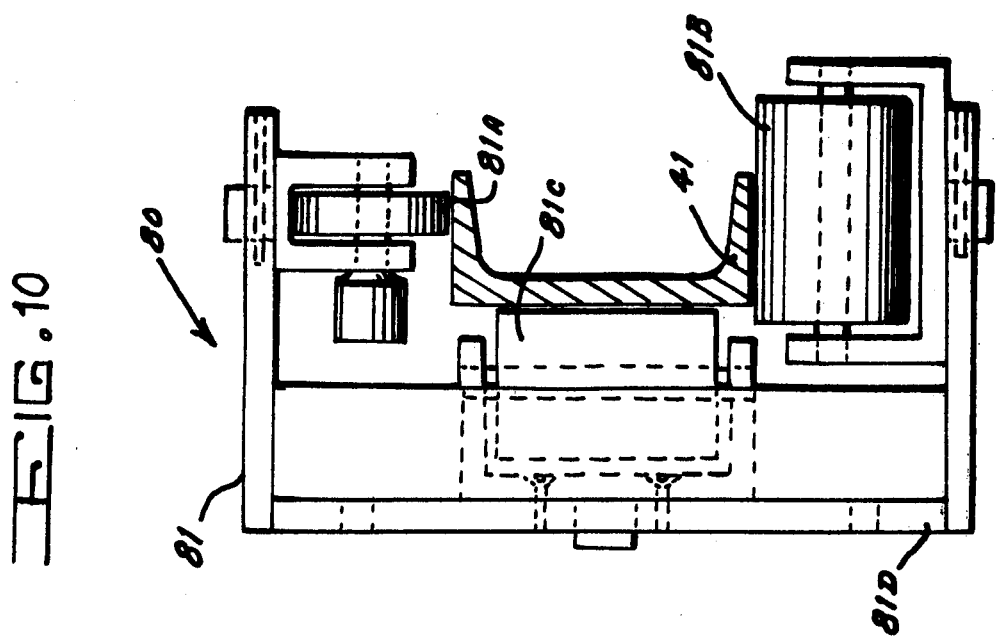

AERIAL PHOTOGRAPHY CAMERA MOUNT ASSEMBLY

STATEMENT OF GOVERNMENT INTEREST

The invention described herein may be manufactured and used by or for the government for governmental purposes without the payment of any royalty thereon.

BACKGROUND OF THE INVENTION

This invention relates generally to aerial photography and, more particularly, to a novel assembly which permits the mounting of a plurality of aerial photography cameras thereon, and permits the taking of vertical and oblique aerial photographs for an aircraft in flight.

In aerial photography of the type needed in aerial reconnaissance, a plurality of cameras are mounted in the aircraft on mounts that are fixedly positioned in predetermined locations in the aircraft to provide maximum coverage of the ground below. In essence, it is fair and accurate to say that aerial photography aircraft are built primarily to accomplish aerial photography, or are extensively modified to accomplish that purpose, with the "trade-off" resulting in a significant lessening of the capability to perform the functions for which the aircraft was built originally.

In the military establishment an urgent need has arisen to use a cargo-type aircraft (i.e., the C-130) to take high quality aerial reconnaissance photography, without adversely affecting the other mission capabilities of the aircraft, and without "missionizing" the aircraft by extensive modifications.

We have invented a unique aerial photography camera mount assembly that fulfills this need; and, thereby, we have significantly advanced the state-of-the-art.

SUMMARY OF THE INVENTION

This invention pertains to a novel aerial photography camera mount assembly, adapted for use in taking aerial reconnaissance photography with aerial cameras in an aircraft having a tail, a downwardly and outwardly opening tail ramp, an internal surface on the tail ramp, a plurality of cargo tiedown rings affixed to the internal surface of the tail ramp, and an upwardly and inwardly opening tail door that is structurally complementary to the tail ramp. with the tail ramp and the tail door being openable and closeable during aerial flight, and also while the aircraft is on the ground.

Accordingly, the principal object of this invention is to teach the structure of such a unique aerial photography camera mount assembly.

This principal object, as well as other related objects, of this invention will become readily apparent after a consideration of the description of the invention, together with reference to the figures of the drawings.

DESCRIPTION OF THE DRAWINGS

FIGS. 2 and 3 are side elevation views, in simplified schematic form, partially fragmented and partially in cross section, of the preferred embodiment of the invention in its environment, both at rest and in use;

FIG. 4 is a top plan view, in simplified schematic form, of a principal subassembly of the invention;

FIG. 10 is a side elevation view, in simplified form, partially pictorial and partially in cross section, of a representative plain roller box constituent component of the invention;

FIG. 11 is a side elevation view, in simplified form, partially pictorial and partially in cross section, of a representative plain roller box component of the invention to which have been attached some of the constituent parts of a means, of the invention, for locking the subassemblies shown in FIGS. 7, 8 and 9 in an extended, or in a retracted, preselected position with relation to the subassembly shown in FIG. 4; and FIG. 12 is a view of one of two alternative means, of the invention, for preventing the inadvertant over-retraction, of the subassemblies shown in FIGS. 7, 8 and 9.

DESCRIPTION OF THE PREFERRED EMBODIMENT

Figure 1:
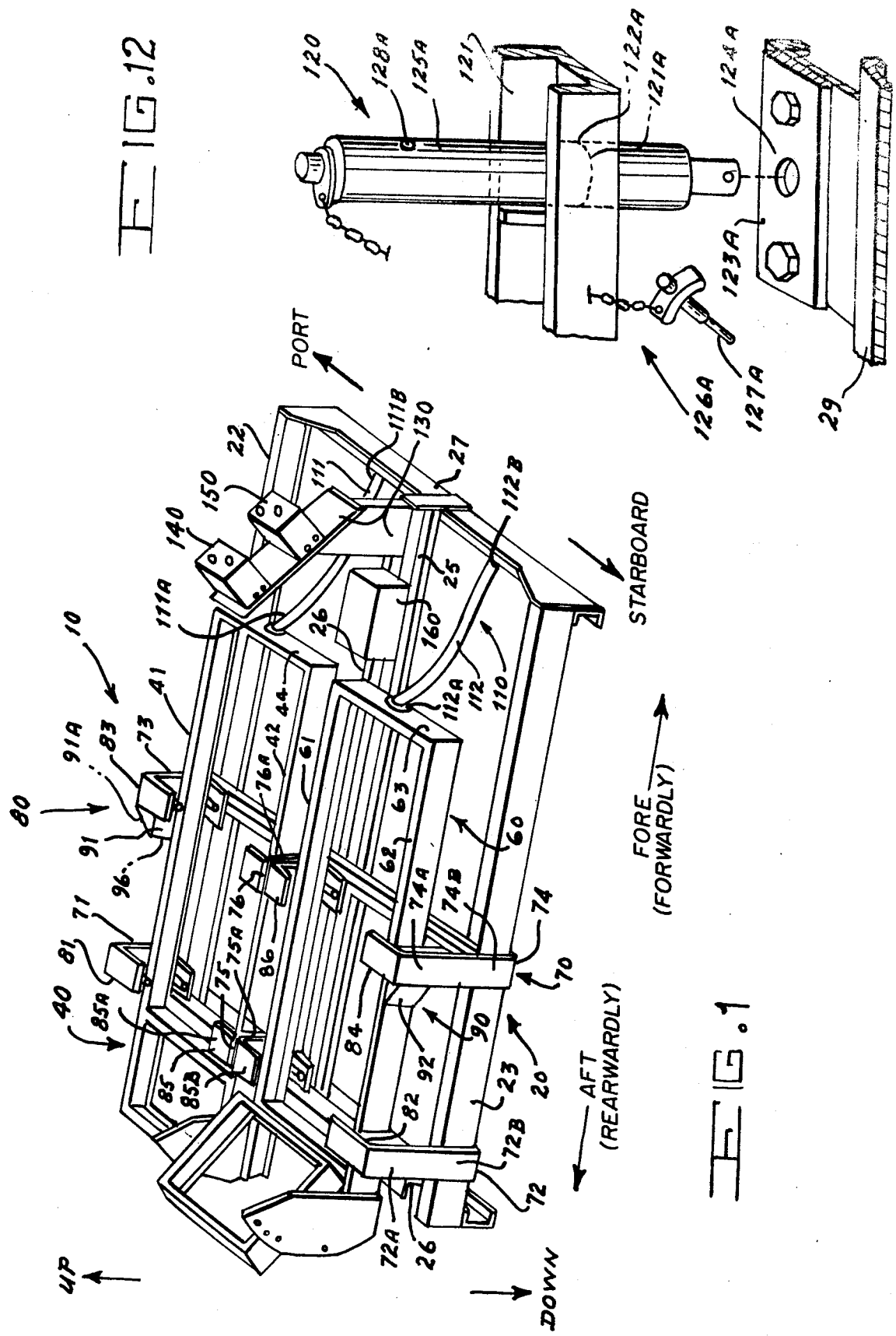
FIG. 1 is a perspective view, in simplified form, both pictorial and schematic, of a preferred embodiment of the invention.

With reference to FIG. 1, therein is shown a preferred embodiment 10 of our invention.

In its most basic and generic form, our invention 10 comprises: a lower member subassembly 20, removably attached to the internal surface of the tail ramp of the aircraft, as will be shown and described later herein; a plurality of upper member subassemblies detachably connected to, and slidably movable in a horizontal direction above, the lower member subassembly 20, with at least one of these subassemblies (such as 40) structured, configured, and dimensioned to accept, support and releasably hold an aerial photography camera in a vertical position, and with at least one other of these subassemblies (such as 60) structured, configured, and dimensioned to accept, support, and releasably hold another aerial photography camera in an oblique position; means (such as 80), connected to the plurality of upper member subassemblies 40 and 60, for locking these subassemblies in an extended, or in a retracted, preselected position; and, means (such as 100), releasably connected to the lower member subassembly 20 and to the plurality of upper member subassemblies 40 and 60, for preventing the inadvertant over-extension, or the inadvertant over-retraction, of the upper member subassemblies 40 and 60 when these subassemblies are not locked, respectively, in a preselected extended position, and/or in a preselected retracted position.

Also shown in FIG. 1, in the interest of orienting the reader are the designations "Fore", "Aft", "Port", "Starboard", "Up" and "Down", together with appropriate directional arrows.

It is here to be noted that, since FIG. 1 is a principal Figure, it will be referred to later herein, to show the relative positional relationships of components, elements, parts and the like of the preferred embodiment 10 of the invention.

In FIG. 2 is shown a portion of the tail 210 of aircraft 200 which has a tail ramp 211 with an internal surface 212, and a tail door 213 that is structurally complementary to the tail ramp 211. Also shown are: the preferred embodiment 10 of our invention removably attached to the internal surface 212 of the tail ramp 211, with the plurality of upper member subassemblies 40 and 60 in a retracted position; aerial photography camera 300 obliquely positioned on subassembly 60. In this view, the tail ramp 211 and the tail door 213 are closed, and another aerial photography camera (i.e., a vertically positioned one) is not shown, in the interest of maintaining simplicity of the Figure. The vertical camera, if shown, would be positioned on subassembly 40.

FIG. 3 shows what is shown in FIG. 2, when: the downwardly and outwardly opening tail ramp 211 is open; the upwardly and inwardly opening tail door 213 is also open; and, the upper subassemblies 40 and 60, as well as the camera 300, are in an extended position.

It is to be noted that, with reference to FIGS. 2 and 3: tail ramp 211 and tail door 213 are openable and closeable during aerial flight of aircraft 200, and also while the aircraft is on the ground; and, a plurality of cargo tiedown rings which are affixed to the internal surface 212 of the tail ramp 211 are not shown, also to maintain simplicity of the Figure, but will be shown and described later herein.

Figure 6:
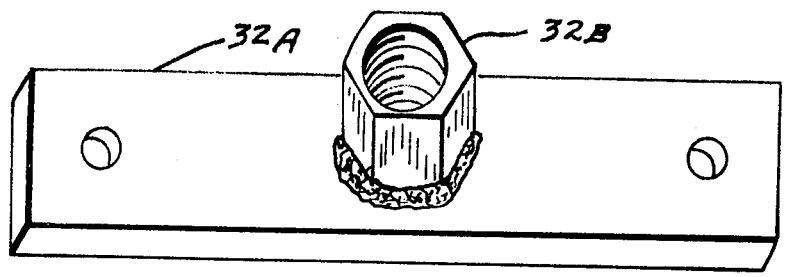
FIGS. 5 and 6 are, respectively, views of a representative tiedown ring adapted assembly component of the invention, and of a component of that assembly.

With reference to FIG. 4, therein is shown, in top plan view and simplified form, the lower member subassembly 20 of our preferred embodiment 10. This subassembly comprises, in essence, a main frame 21, and a plurality of tiedown ring adapter assemblies (not shown, but see FIGS. 5 and 6 later herein). The main frame 21 includes: a plurality, preferably four, of side frame members, such as 22, 23, 24 and 25; a plurality, preferably two, of end frame members, such as 26 and 27; and, a plurality, preferably two, of top frame members, such as 28 and 29. All frame members are suitably interconnected, as shown in FIGS. 1 and 4, to form the main frame 21; and, all frame members preferably are made of metal, and also preferably of aluminum channel.

More specifically, the main frame 21 includes: a plurality of at least a first 22, a second 23, a third 24, and a fourth 25 parallel, spaced-apart side frame members, with each side frame member having a first end (i.e., 22A for 22, 23A for 23, 24A for 24 and 25A for 25) and a second end (i.e., 22B for 22, 23B for 23, 24B for 24, and 25B for 25), and with member 22 hereinafter referred to as the "first outer frame member", member 23 hereinafter referred to as the "second outer frame member", member 24 hereinafter referred to as the "first inner frame member", and member 25 hereinafter referred to as the "second inner frame member"; a first 26 and a second 27 end frame members disposed transverse (i.e., lateral) to the plurality of side frame members, with the first end frame member 26 connected to all first ends, such as 22A, 23A, 24A and 25A, of the side frame members, and with the second end frame member 27 connected to all second ends, such as 22B, 23B, 24B, and 25B of the side frame members; and, a first 28 and a second 29 parallel, and equally spaced-apart, top frame members disposed on, transverse to, and in abutting contact with the plurality of said frame members, and with the top frame members positioned intermediate of the end frame members and connected to the side frame members.

Figure 5:
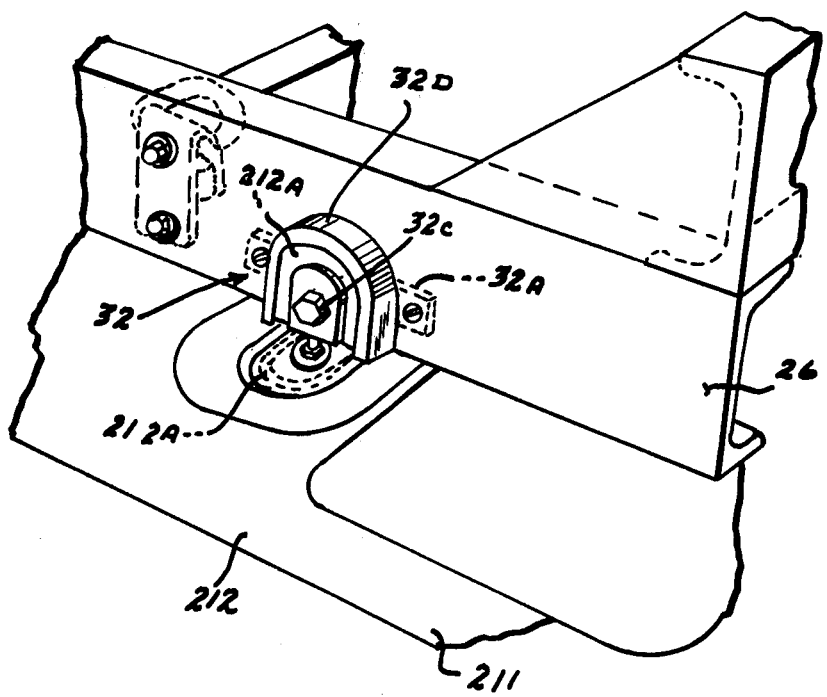

The main frame 21 also more specifically includes a plurality, preferably four, of tiedown ring adapter assemblies, such as 31, 32, 33 and 34, FIGS. 4 and 5, with at least one (and, preferably, two) of the adapter assemblies, such as 31 and 32, attached to the first end frame member 26, and with at least one (and, preferably, two) of the adapter assemblies, such as 33 and 34, attached to the second end frame member 27. Each of the tiedown ring adapter assemblies, such as representative one 32, includes: a nut plate 32A, FIGS. 5 and 6, having a projecting nut 32B, FIG. 5, with the nut plate 32A attached to its respective end frame member (e.g., nut plate 32A attached to end frame member 26); a bolt 32C, FIG. 5, complementary to, and mating with, the nut 32B; and, a tiedown ring adapter 32D, configured to accept one of the plurality of cargo tiedown rings, such as 212A, FIG. 5, that are affixed to the internal surface 212 of the tail ramp 211, with the adapter 32D interposed between the nut plate 32A and the bolt 32C, and holding therebetween the cargo tiedown ring, such as 212A. Shown in phantom in FIG. 5 is the cargo tiedown ring 212A when it is in its flat, unused position, which is not the case here, because the ring 212A is in use.

Figure 7:
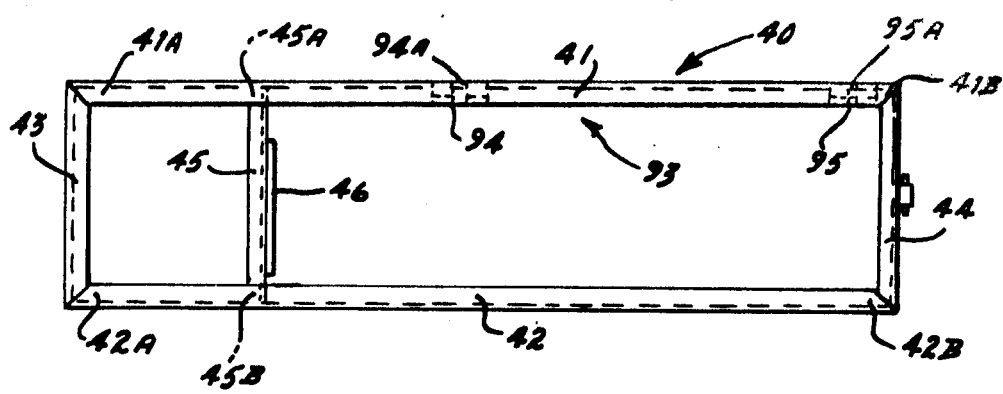
FIG. 7 is a top plan view, in simplified schematic form, of another principal subassembly of the invention.

With reference to FIG. 7, therein is shown one 40 of the plurality of upper member subassemblies, hereinafter referred to as the "first member subassembly". This subassembly 40 is representative of ones in the invention 10 that are structured, configured, and dimensioned to accept, support, and releasably hold an aerial photography camera in a vertical position. This first member subassembly 40, as well as any other such one in the plurality, includes: a first finite length side frame component 41 having a first end 41A and a second end 41B; a second side frame component 42, of the same length as first side frame component 41, having a first end 42A and a second end 42B, with this component 42 disposed parallel to, and in equal spaced-apart relationship with, the first side frame component 41; a first end frame component 43 affixed to the first end 41A of the first side frame component 41 and to the first end 42A of the second side frame component 42; a second end frame component 44 affixed to the second end 41B of the first side frame component 41 and to the second end 42B of the second side frame component 42; an intermediate frame component 45 affixed to the first side frame component 41 near the first end 41A, and affixed to the second side frame component 42 near the first end 42A, with this intermediate frame component 45 disposed intermediate of the first 43 and second 44 end frame components and parallel to these components 43 and 44; and, a flat plate-like member 46 affixed in a vertical position to the intermediate frame component 45.

Now, with reference to FIGS. 8 and 9, therein are shown two views of one other 60 of the plurality of hereinafter referred to as the "second member subassembly". This subassembly 60 is representative of ones in this invention 10 that are structured, configured, and dimensioned to accept, support, and releasably hold an aerial camera in oblique position. This second member subassembly, as well as any other such one in the plurality, includes: a finite length first side component having a first end 61A and a second end 61B; a second side frame component 62, of the same length as the first side frame component 61, and having a first end 62A and a second end 62B, and disposed parallel to, and in equal spaced-apart relationship with, the first side frame member 61; an end frame component 63 affixed to the second end 61B of the first side frame component 61 and to the second end 62B of the second side frame component 62; an intermediate frame component 64 affixed to the first side frame component 61 near that component's first end 61A, and affixed to the second side frame component 62 near that component's first end 62A, with this intermediate frame component 64 disposed forward of, and parallel to, the end frame component 63; and, a box frame subassembly 65 structured, configurated and dimensioned to accept, support and releasably hold an obliquely positionable aerial photography camera, with this box section subassembly 65 including a rectangular shaped (hollow) shell 66 having a aft edge 66A, an fore edge 66B, and a starboard edge 66C, with the fore edge 66B hingedly attached to the intermediate frame component 64, and with this box frame assembly 65 also including means (generally designated 67) for selectively varying the angularity of the starboard edge 66C in relation to the second side frame component 62 and the intermediate frame component 64.

Figure 8:
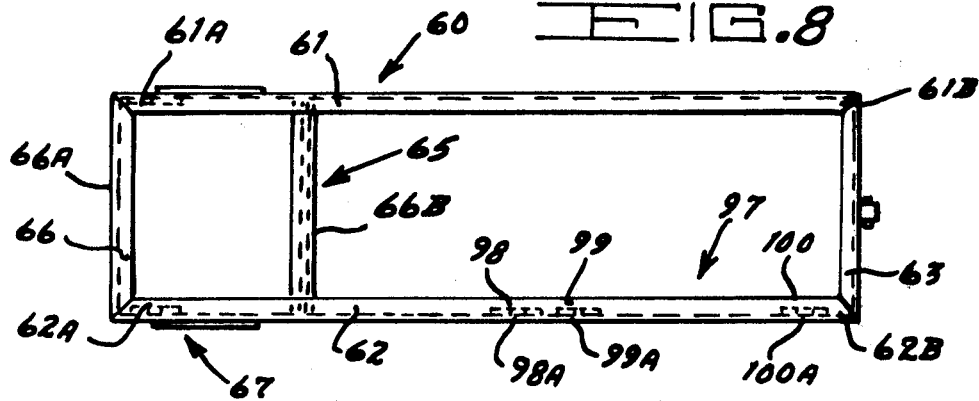
FIGS. 8 and 9 are, respectively, top plan and side elevation views, in simplified schematic form, of still another principal subassembly of the invention.
Figure 9:
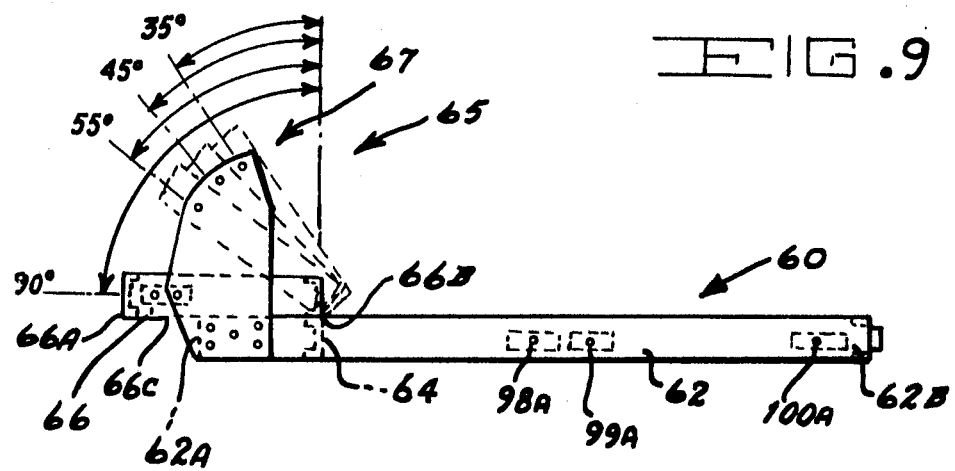

With reference to FIGS. 1 and 4, the plurality of upper member subassemblies, such as 40 and 60, are detachably connected to, and are slidably movable horizontally above, the lower member subassembly 20 by means (generally designated 70) which includes: a plurality of at least a first 71, a second 72, a third 73, a fourth 74, a fifth 75, and a sixth 76 roller box supports, with each support (such as 72 and 74, FIG. 1) having an upper portion (such as 72A for 72, and 74A for 74, FIG. 1) and an upper portion (such as 72B for 72 and 74B for 74), with the first 71 and second 72 supports connected at their lower portions 71B and 72B, to, respectively, the rearward portions of the first 22 and the second 23 outer side frame members of the main frame 21 of the lower member subassembly 20, and with the third 73 and the fourth 74 of the supports connected at their lower portions 73B and 74B to, respectively, the first 22 and second 23 outer frame members of the main frame 21 at locations forwardly (i.e., fore) of the first 71 and the second 72 supports, and with the fifth 75 and the sixth 76 of the supports connected at their lower portions 75B and 76B to, respectively, the first 24 and the second 25 inner frame members of the main frame 21; and, a plurality (generally designated 80) of at least a first 81, a second 82, a third 83, and a fourth 84 plain roller boxes, FIGS. 1, 10 and 11, with each plain roller box, such as representative one 81, FIG. 10, two mutually opposed horizontally disposed rollers, such as 81A and 81B of box 81, a vertically disposed roller, such as 81C of box 81, and a holder, such as 81D to which the rollers 81A 81B and 81C are attached, with the first 81, the second 82, the third 83, and the fourth 84 roller boxes connected, respectively, to the respective upper portions 71A, 72A, 73A and 74A of the first 71, the second 72, the third 73, and the fourth 74 roller box supports, FIGS. 1 and 4, and with the first 81 and the third 83 plain roller boxes disposed in abutting sliding contact with the first outer side frame component 41 of the first member subassembly 40, FIGS. 1 and 7, and with the second 82 and the fourth 84 plain roller boxes disposed in abutting sliding contact with the second side frame component 62 of the second side member subassembly 60, FIGS. 1, 8 and 9; and, a plurality of at least a first 85 and a second 86 back-to-back plain roller boxes, FIGS. 1, 4 and 11, comprising two oppositely facing plain roller box, such as 85A and 85B, FIGS. 1 and 4, attached to each other, with the first back-to-back box 85 also attached to the upper portion 75A of the fifth roller box support 75, and with the second back-to-back box 86 also attached to the upper portion 76A of the sixth roller box support 76, and with both the first and the second back-to-back boxes 85 and 86 disposed in abutting sliding contact with the second side frame component 42 of the first member subassembly 40 and with the first side frame component 61 of the second member subassembly 60.

Now, with reference to FIGS. 11, 4, 1, 7 and 8, therein is shown means (generally designated 90) for locking the upper member subassemblies in an extended, and/or in a retracted, preselected position. This mean 90 includes: a first bracket 91, with a hole 91A therein and therethrough, attached to the third plain roller box 83; a second bracket 92, with a hole 92A therein and therethrough, attached to the fourth plain roller box 84; means 93, FIG. 7, for locating, and stopping at, any one of two predetermined locations 94 and 95 on the first side frame component 41 of the first member subassembly 40, FIG. 7, with the means 93 including a hole 94A and 95A in and through the first side component 41, FIG. 7, at, respectively, each of the two predetermined locations 94 and 95 on the first side component 41; a first locking pin 96, FIG. 4, removably insertable into and through hole 91A, FIG. 4, in the first bracket 91, as well as simultaneously and selectively into either hole 94A at location 94, FIG. 7, or hole 95A at location 95, FIG. 7; means 97, FIG. 8, for locating, and for stopping at, any one of three predetermined locations 98, 99 and 100 on the second side frame component 62 of the second member subassembly 60, FIG. 8, with the means 97 including a hole 98A, 99A and 100A in and through the second side frame component 62, FIG. 8, at, respectively, each of the three locations 98, 99 and 100 on the second side component 62; and, a second locking pin 101 removably insertable into and through hole 92A, FIG. 11, in second bracket 92, and simultaneously and selectively, into and through any one of the holes 98A, 99A and 100A at locations 98, 99 and 100, FIG. 8.

With reference to FIGS. 1 and 12, therein are shown two alternative means 110 and 120 for preventing the inadvertant over-extension, and/or inadvertant over-retraction, of upper member assemblies 40 and 60. Means 110, FIG. 1, includes: a first tether strap 111, of predetermined length, having a first end 111A and a second end 111B, with the first end 111A attached, by suitable conventional means, to the second end frame component 44, FIGS. 1 and 7, first member subassembly 40, FIGS. 1 and 7, and with the second end 111B attached to the second end frame member 27, FIGS. 1 and 4, of the main frame 21, FIGS. 1 and 4; and, a second tethered strap 112, of predetermined length, having a first end 112A and a second end 112B, with the first end 112A attached to the second end frame component 63, FIGS. 8 and 1, of the second member component 60, FIGS. 8 and 1, and with the second end 112B attached to the second end frame member 27, FIGS. 1 and 4, of the main frame 21, FIGS. 1 and 4.

With reference to FIG. 12, therein is shown the alternative means 120 for preventing the inadvertant overextension, and/or the inadvertant over-retraction, of upper member subassemblies 40 and 60, FIGS. 1, 7 and 8. With regard to this means 120, and in the interest of maintaining simplicity of the drawings, particularly FIGS. 1, 4 and 12, in FIG. 12 will be shown only one representative portion of the means 120, since the other portion is identical to, and a duplicate of, that portion shown in FIG. 12. This alternative means 120 includes: an upper frame member 121, FIG. 12, disposed above and attached to, the third plain roller box 83, FIGS. 1 and 4, and the fourth plain roller box 84, FIGS. 1 and 4, and the second back-to-back plain roller box 86, FIGS. 1 and 4, with the frame member having a first hole 121A, FIG. 12, and a second hole (not shown) in and through the frame member 121 at, respectively a first 122A, FIG. 12, and a second (not shown) predetermined location on frame member 121; a first bracket 123A, FIG. 12, and a second bracket (not shown), each with a hole therein and therethrough (i.e., hole 124A for first bracket 123A), with each hole directly opposed, respectively, to its corresponding hole in the upper frame member 121 (e.g., hole 124A in bracket 123A is directly opposed to hole 122A in frame member 121, and with each bracket, such as 123A, attached to the second intermediate frame member 29. FIGS. 12 and 4; a first safety rod 125A, FIG. 12, and a second safety rod (not shown), each of which is removably insertable into and through its respective and corresponding hole in the upper frame member 121 and its respective bracket (i.e., first safety rod 125A is removably insertable into and through hole 121A in upper frame member 121 and hole 124A in bracket 123A); and, means for preventing the first and the second safety rods from falling through their respective, and corresponding hole in the upper frame member 121, FIG. 12, and their respective brackets. In FIG. 12, that means is generally designated 126A for first safety rod 125A, and includes a pin 127A that is attached to first safety rod 125A, and that is removably insertable into hole 128A in first safety rod 125A.

With reference to FIG. 1, the preferred embodiment 10 of our invention includes a support, such as 130, for a means to control any aerial photography camera that is accepted, supported, and releasably held by any of the plurality of upper member subassemblies, such as 40 and 60. The means may include camera control boxes, such as 140 and 150, one for each camera to be controlled, with the control boxes secured to the support 130, and with the support connected to the main frame 21 of the lower member subassembly 20.

Still with reference to FIG. 1, the preferred embodiment 10 of our invention includes, out of preference and not because of any limitations, an openable and closeable container, such as 160, for housing tools and spare parts, with the container preferably connected to the main frame 21 of the lower member subassembly.

MANNER OF OPERATION OF THE PREFERRED EMBODIMENT

The manner of operation of the preferred embodiment 10 of our invention can be very easily ascertained by any person of ordinary skill in the art from the foregoing description, coupled with reference to the Figures of the drawings.

For others, it is sufficient to say that when it is desired to take either a vertical, or an oblique, aerial photograph (or both, as is usual, and necessary in most situations in the art), by using our invention 10 in the described aircraft 200, FIGS. 2 and 3, when the aircraft 200 is in flight, the closed tail ramp 212 and the tail door 213 are both opened; the assembly 10 becomes external of the aircraft, FIG. 3; the lower subassemblies are unlocked, are extended (i.e., outwardly over the ramp), FIG. 3, and are locked in place by using locking pins, such as 101, FIG. 11. The photographs are taken; and, the reverse procedure is followed, resulting in the unlocking of the extended lower subassemblies, the retracting of these subassemblies, the locking of these subassemblies in place; and, the closing of the tail ramp and of the tail door. The tether straps 111 and 112, FIG. 1, prevent the overextension and the over-retraction of the lower subassemblies. The means 120, FIG. 12, may be used in lieu of the tether straps to prevent over-extension and over-retraction.

CONCLUSION

It is abundantly clear from all of the foregoing, and from the Figures of the drawings, that the stated principal object, as well as other related objects, of our invention have been achieved.

It is to be noted that, although there have been described the fundamental and unique features of our invention as applied to a preferred embodiment, various other embodiments, variations, adaptations, substitutions, additions, omissions, and the like may occur to, and can be made by, those of ordinary skill in the art, without departing from the spirit of our invention.

What is claimed is:

1. An aerial photography camera mount assembly, adapted for use with an aircraft having a tail, a downwardly and outwardly opening tail ramp, an internal surface on said tail ramp, a plurality of cargo tiedown rings affixed to said internal surface, and an upwardly and inwardly opening tail door complementary to said tail ramp, wherein said tail ramp and said tail door can be opened and closed during aerial flight of said aircraft, comprising:
   a. a lower member subassembly removably attached to said internal surface of said tail ramp;
   b. a plurality of upper member subassemblies detachably connected to, and slidably movable horizontally above, said lower member subassembly, with at least one of said upper member subassemblies structured, configurated, and dimensioned to accept, support, and releasably hold an aerial photography camera in a vertical position, and with at least one other of said upper member subassemblies structured, configurated, and dimensioned to accept, support, and releasably hold another aerial photography camera in an oblique position;
   c. means, connected to said plurality of upper member subassemblies, for locking said subassemblies in an extended, and in a retracted, preselected position;
   d. and, means, releasably connected to said lower member subassembly and to said plurality of upper member subassemblies, for preventing the inadvertant over-extension, and the inadvertant over-retraction, of said plurality of upper member subassemblies when said plurality of upper member subassemblies are not locked, respectively, in a preselected extended position, and in a preselected retracted position.

2. An aerial photography camera mount assembly, as set forth in claim 1, wherein said lower member subassembly comprises:
   a. a main frame which includes:
      (1) a plurality of at least a first, a second, a third, and a fourth parallel, spaced-apart side frame members, with each side frame member having a first end and a second end, and with said first side frame member comprising a first outer frame member, said second side frame member comprising a second outer frame member, said third side frame member comprising a first inner side frame member, and said fourth side frame member comprising a second inner frame member, and with each of side frame members having a forward portion;
      (2) a first and a second end frame members disposed transverse to said plurality of side frame members, with said first end frame member connected to all said first ends of said side frame members, and with said second end frame member connected to all said second ends of said side frame members;

(3) and, a first and a second parallel and equally spaced-apart top frame members disposed on, transverse to, and in abutting contact with, said plurality of side frame members, with said top frame members positioned intermediate of said end frame members and connected to said side frame members;

b. and, a plurality of tiedown ring adapter assemblies, with at least one of said adapter assemblies attached to said first end frame member, and with at least another one of said adapter assemblies attached to said second end frame member, wherein each of said tiedown ring adapter assemblies includes:

(1) a nut plate having a projecting nut, with said nut plate attached to an appropriate, and its respective, end frame member;

(2) a bolt complementary to, and mating with, said nut;

(3) and, a tiedown ring adapter, configured to accept one of said cargo tiedown rings that are affixed to said internal surface of the tail ramp, with said adapter interposed between said nut plate and said bolt, and holding therebetween said cargo tiedown ring.

3. An aerial photography camera mount assembly, as set forth in claim 1, wherein said plurality of upper member subassemblies includes at least:

a. a first member subassembly, structured, configurated, and dimensioned to accept, support, and releasably hold an aerial photography camera in a vertical position, which comprises:

(1) a finite length first side frame component having a first end and a second end;

(2) a second side frame component, of the same length as said first side frame component, and having a first end and a second end, and also disposed parallel to, and in equal spaced-apart relationship with, said first side frame component;

(3) a first end frame component affixed to said first end of said first side frame component and to said first end of said second side frame component;

(4) a second end frame component affixed to said second end of said first side frame component and to said second end of said second side frame component;

(5) an intermediate frame component affixed to said first side frame component near said first end of said first side frame component, and affixed to said second side frame component near said first end of said second frame component, with said intermediate frame component disposed intermediate of said first and said second end frame components and parallel thereto;

(6) and, a flat plate-like member affixed in a vertical position to said intermediate frame component;

a second member subassembly, structured, configurated, and dimensioned to accept, support, and releasably hold an aerial photography camera in an oblique position, which comprises:

(1) a finite length first side component having a first end and a second end;

(2) a second side frame component, of the same length as said first side frame component, and having a first end and a second end, and disposed parallel to, and in equal spaced-apart relationship with, said first side frame component;

(3) an end frame component affixed to said second end of said first side frame component and to said second end of said second side frame component;

(4) an intermediate frame component affixed to said first side frame component near said first end of said first side frame component, and affixed to said second side frame component near said first end of said second frame component, with said intermediate frame component disposed forward of, and parallel to, said end frame component;

(5) and, a box section subassembly structured, configurated, and dimensioned to accept, support and releasably hold an obliquely positionable aerial photography camera, wherein said box section subassembly includes a rectangular shaped shell having a fore edge, an aft edge, and a port edge, with said aft edge hingedly attached to said intermediate frame component of this said second member subassembly, and wherein said box section subassembly also includes means for selectively varying the angularity of said port edge in relation to said second side frame component and said intermediate frame component.

4. An aerial photography camera mount assembly, as set forth in claim 3, wherein said plurality of upper member subassemblies are detachably connected to, and are slidably movable horizontally above, said lower member subassembly by means which includes:

a. a plurality of at least a first, a second, a third, a fourth, a fifth, and a sixth roller box supports, with each support having an upper portion and a lower portion, with said first and second of said supports connected at their lower portions to, respectively, said forward portions of said first and second outer side frame members of said main frame of said lower member subassembly, and with said third and fourth of said supports connected at their lower portions to, respectively, said first and second outer side frame members of said main frame at respective locations rearwardly of said first and second supports, and with said fifth and sixth of said supports connected at their lower portions to, respectively, said first and second inner frame members of said main frame;

b. a plurality of at least a first, a second, a third, and a fourth plain roller boxes, wherein each said plain roller box comprises two mutually opposed horizontally disposed rollers, a vertically disposed roller, and a holder to which said rollers are attached, with first, second, third and fourth plain roller boxes connected, respectively, to said respective upper portions of said first, second, third, and fourth roller box supports, and with said first and third plain roller boxes disposed in abutting sliding contact with said first outer side frame component of said first member subassembly of said upper member subassemblies, and with said second and fourth plain roller boxes disposed in abutting sliding contact with said second side frame component of said second member subassembly of said upper member subassemblies;

c. and, a plurality of at least a first and a second back-to-back plain roller boxes, wherein each said back-to-back box comprises two oppositely facing plain roller boxes attached to each other, with said first back-to-back box also attached to said upper portion of said fifth roller box support, and with said second back-to-back box also attached to said upper portion of said sixth roller box support, and also with said first and second back-to-back boxes disposed in abutting sliding contact with said second side frame component of said first member subassembly of said plurality of upper member subassemblies, and also in abutting sliding contact with said first side frame component of said second member subassembly of said plurality of upper member subassemblies.

5. An aerial photography camera mount assembly, as set forth in claim 4, wherein said means for locking said upper member subassemblies in an extended, and in a retracted, preselected position, comprises:
   a. a first bracket, with a hole therein and therethrough, attached to said third plain roller box;
   b. a second bracket, with a hole therein and therethrough, attached to said fourth plain roller box;
   c. means for locating, and stopping at, any one of two predetermined locations on said first side frame component of said first member subassembly of said plurality of upper member subassemblies, wherein said means includes a hole in and through said first side frame component at each of said two predetermined locations thereon;
   d. a first locking pin removably insertable into and through said hole in said first bracket, and simultaneously and selectively into and through said hole at each of said two predetermined locations on said first side frame component;
   e. means for locating, and for stopping at, any one of three predetermined locations on said second side frame component of said second member subassembly of said plurality of upper member subassemblies, wherein said means includes a hole in and through said second side frame component at each of three predetermined locations thereon;
   f. and, a second locking pin removably insertable into and through said hole in said second bracket and simultaneously and selectively into and through said hole at each of said three predetermined locations on said second side frame component.

6. An aerial photography camera mount assembly, as set forth in claim 5, wherein said means for preventing the inadvertant over-extension and over-retraction of said plurality of upper member subassemblies comprises:
   a. a first tether strap, or predetermined length, having a first end and a second end, with first end attached to said second end frame component of said first member subassembly of said plurality of upper member subassemblies, and with said second end attached to said second end frame member of said main frame of said lower member subassembly;
   b. and, a second tether strap, of predetermined length, having a first end and a second end, with said first end attached to said second end frame component of said second member subassembly of said plurality of upper member subassemblies, and with said second end attached to said second end frame member of said main frame of said lower member subassembly.

7. An aerial photography camera mount assembly, as set forth in claim 5, wherein said means for preventing the inadvertant over-extension and over-retraction of said plurality of upper member subassemblies comprises:
   a. an upper frame member disposed above, and attached to, said third plain roller box, said fourth plain roller box, and said second back-to-back plain roller box, with said frame member having a first and a second hole in and through said frame member at, respectively, a first and a second predetermined location on said frame member;
   b. a first bracket, with a hole therein and therethrough, attached to said second intermediate frame member of said main frame, with said bracket hole directly opposed to said first hole in said upper frame member;
   c. a second bracket, with a hole therein and therethrough, attached to said second intermediate frame member of said main frame, with said bracket hole directly opposed to said second hole in said upper frame member;
   d. a first safety rod removably insertable into and through said first hole in said upper frame member and simultaneously into and through said hole in said first bracket;
   e. means for preventing said first safety rod from falling through said first hole in said upper frame member and said hole in said first bracket;
   f. a second safety rod removably insertable into and through said second hole in said upper frame member and simultaneously into and through said hole in said second bracket;
   g. and, means for preventing said second safety rod from falling through said second hole in said upper frame member and said hole in said second bracket.

8. An aerial photography camera mount assembly, as set forth in claim 7, wherein said lower member subassembly, said plurality of upper member subassemblies, said means for locking said upper member subassemblies in an extended, and in a retracted, preselected position, and said means for preventing the inadvertant over-extension, and the inadvertant over-retraction, of said upper member subassemblies when said upper member subassemblies are not locked, respectively, in a preselected extended position, and in a preselected retracted position, are made of metal.

9. An aerial photography camera mount assembly, as set forth in claim 1, wherein said assembly also comprises a support, for a means to control any aerial photography camera accepted, supported, and releasably held by any of said plurality of upper member subassemblies, wherein said support is conn-cted to said lower member subassembly.

10. An aerial photography camera mount assembly, as set forth in claim 1, wherein said assembly also comprises an openable and closeable container, for housing tools and spare parts, wherein said container is connected to said lower member subassembly.

* * * * *